(12) United States Patent
Singh

(10) Patent No.: US 11,825,351 B2
(45) Date of Patent: Nov. 21, 2023

(54) ENHANCED PROXIMITY SERVICES FUNCTION TO IMPROVE TRAFFIC USAGE ON A PREFERRED NETWORK

(71) Applicant: Charter Communications Operating, LLC, St. Louis, MO (US)

(72) Inventor: Lakhbir Singh, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 88 days.

(21) Appl. No.: 17/574,015

(22) Filed: Jan. 12, 2022

(65) Prior Publication Data

US 2023/0224757 A1    Jul. 13, 2023

(51) Int. Cl.
*H04W 28/08* (2023.01)
*H04W 8/18* (2009.01)
*H04W 88/06* (2009.01)

(52) U.S. Cl.
CPC ......... *H04W 28/0875* (2020.05); *H04W 8/18* (2013.01); *H04W 28/0846* (2020.05); *H04W 28/09* (2020.05); *H04W 88/06* (2013.01)

(58) Field of Classification Search
CPC ............... H04W 28/0875; H04W 8/18; H04W 28/0846; H04W 28/09; H04W 88/06
See application file for complete search history.

(56) References Cited

U.S. PATENT DOCUMENTS

| | | | | |
|---|---|---|---|---|
| 2010/0017506 | A1* | 1/2010 | Fadell | H04L 43/0882 709/224 |
| 2015/0133130 | A1* | 5/2015 | Gupta | H04W 36/00837 455/450 |
| 2020/0092798 | A1* | 3/2020 | Abraham | H04W 88/06 |
| 2020/0314629 | A1* | 10/2020 | Kreishan | H04W 8/183 |
| 2023/0047213 | A1* | 2/2023 | Chen | H04W 36/0022 |

OTHER PUBLICATIONS

3GPP "Proximity services (ProSe) functionality as described in the Third Generation Partnership Technical Specification Section", ETSI, TS 23.303, version 15.1.0, Release 15, (2018), https://www.etsi.org/deliver/etsi_ts/123300_123399/123303/15.01.00_60/ts_123303v150100p.pdf.

* cited by examiner

*Primary Examiner* — Jung H Park
(74) *Attorney, Agent, or Firm* — Young Basile Hanlon & MacFarlane, P.C.

(57) ABSTRACT

Methods and systems for providing an enhanced proximity services. The method includes monitoring, by a proximity controller provisioned in a preferred network, dual subscriber identification module (SIM) dual subscriber (DSDS) devices operating in the preferred network, detecting, by the proximity controller, a DSDS device operating in a non-preferred network, wherein the DSDS devices and the DSDS device are configured to switchably operate in one of the preferred network or the non-preferred network based on coverage, locating, by the proximity controller, from the monitored DSDS devices a DSDS device proximate to the DSDS device operating in the non-preferred network, and enabling, by the proximity controller, the proximate DSDS device and the DSDS device operating in the non-preferred network to establish a sidelink communication channel between the proximate DSDS device and the DSDS device operating in the non-preferred network for offloading data communications from the non-preferred network to the preferred network.

20 Claims, 10 Drawing Sheets

ENHANCED PROXIMITY SERVICES FUNCTION TO IMPROVE TRAFFIC USAGE ON A PREFERRED NETWORK

TECHNICAL FIELD

This disclosure relates to wireless communications. More specifically, this disclosure relates to managing traffic or data usage on a service provider controlled or owned network (a preferred network) versus non-preferred networks.

BACKGROUND

Service providers offer users or customers dual subscriber identification module (SIM) dual subscriber (DSDS) devices, which can operate on a service provider network or a different network. Although this provides the customer with wider coverage, the service providers would like the DSDS devices to maximize operation on the service provider network as the service providers pay higher costs for data traffic on the different network. Proximity services (ProSe) functionality as described in the Third Generation Partnership Technical Specification Section 23.303 (see https://www.etsi.org/deliver/etsi_ts/123300_123399/123303/15.01.00_60/ts_123303v150100p.pdf) (3GPP TS 23.303) enable a first mobile device which is out of coverage from a network to establish a sidelink connection with a second mobile device which is in coverage of the network. The second mobile device acts as a relay hop which enables the first mobile device to access the network. However, there is no mechanism for a first DSDS device which is in coverage on the different network to direct traffic to the service provider traffic via a second DSDS device that is in coverage of the service provider network since the first DSDS device is not out of coverage of a network as required by the currently above-noted ProSe functionality.

SUMMARY

Disclosed herein are methods and systems for providing an enhanced proximity services function to improve traffic usage on a preferred network.

In some implementations, the method includes monitoring, by a proximity services controller provisioned in a preferred network, dual subscriber identification module (SIM) dual subscriber (DSDS) devices operating in the preferred network, detecting, by the proximity services controller, a DSDS device operating in a non-preferred network, wherein the DSDS devices and the DSDS device are configured to switchably operate in one of the preferred network or the non-preferred network based on coverage, locating, by the proximity services controller, from the monitored DSDS devices a DSDS device proximate to the DSDS device operating in the non-preferred network, and enabling, by the proximity services controller, the proximate DSDS device and the DSDS device operating in the non-preferred network to establish a sidelink communication channel between the proximate DSDS device and the DSDS device operating in the non-preferred network for offloading data communications from the non-preferred network to the preferred network.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Figure 1:
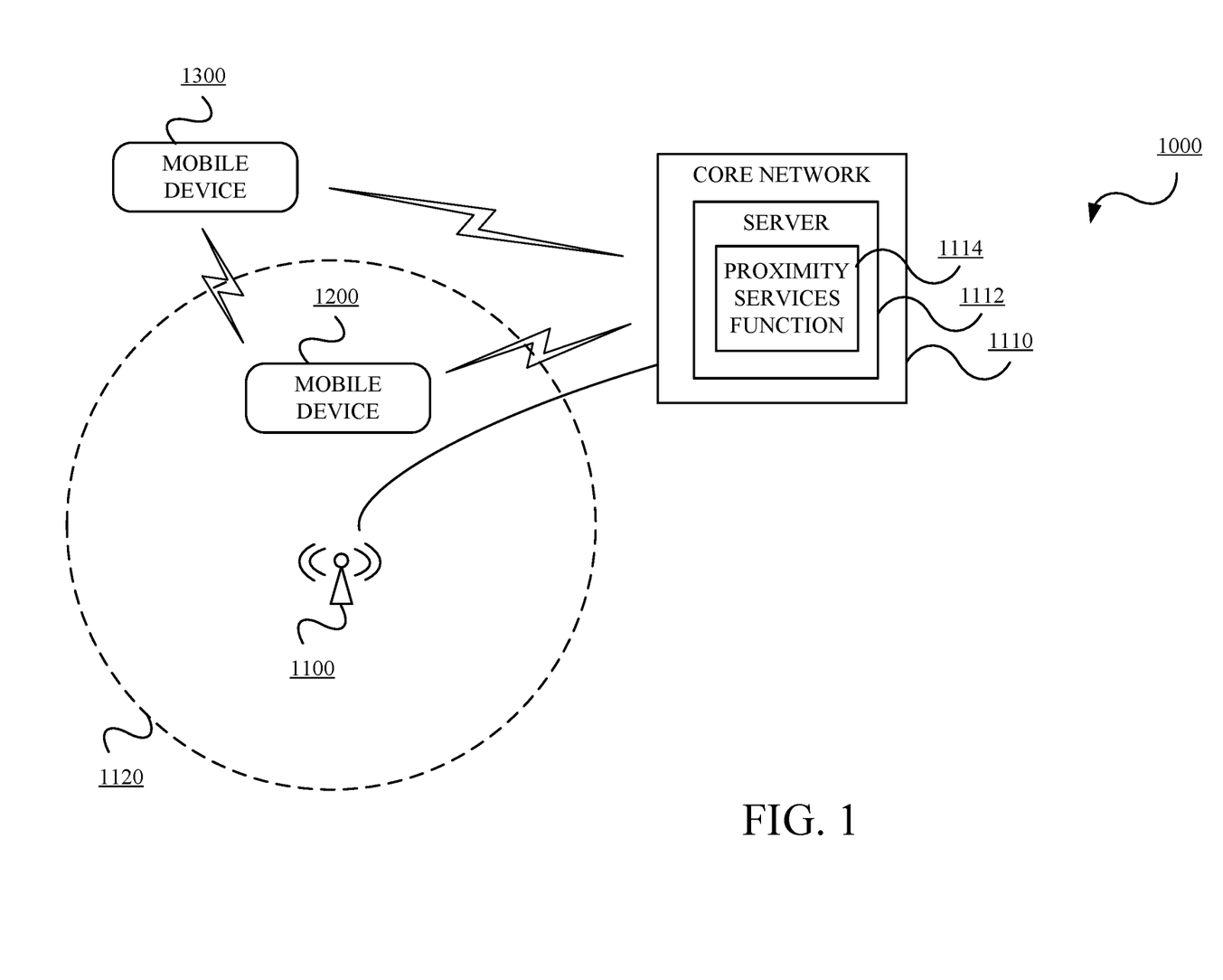
FIG. 1 is a diagram of an example network with proximity services functionality.

FIG. 1 is a diagram of an example network 1000 with proximity services functionality. The system 1000 includes one or more base stations 1100 connected to or in communication with (collectively "connected to") a core network 1110, which together provide a wireless coverage 1120. The core network 1110 includes a server, computing device, or processor 1112 which provides a proximity services (ProSe) function or application 1114 as described in 3GPP TS 23.303. Mobile devices 1200 and 1300 are registered with the ProSe function 1114. The ProSe 1114 initiates ProSe function processing once ProSe 1114 detects that the mobile device 1300 is outside of the wireless coverage 1120 and that the mobile device 1200 is in proximate location to the mobile device 1300. That is, the mobile device 1300 has no wireless coverage. The mobile devices 1200 and 1300 establish a sidelink using device-to-device (D2D) communications as a result of successful ProSe function processing. The mobile device 1300 is then able to direct traffic over the network 1000 although the mobile device 1300 is outside of the wireless coverage 1120.

Figure 2:
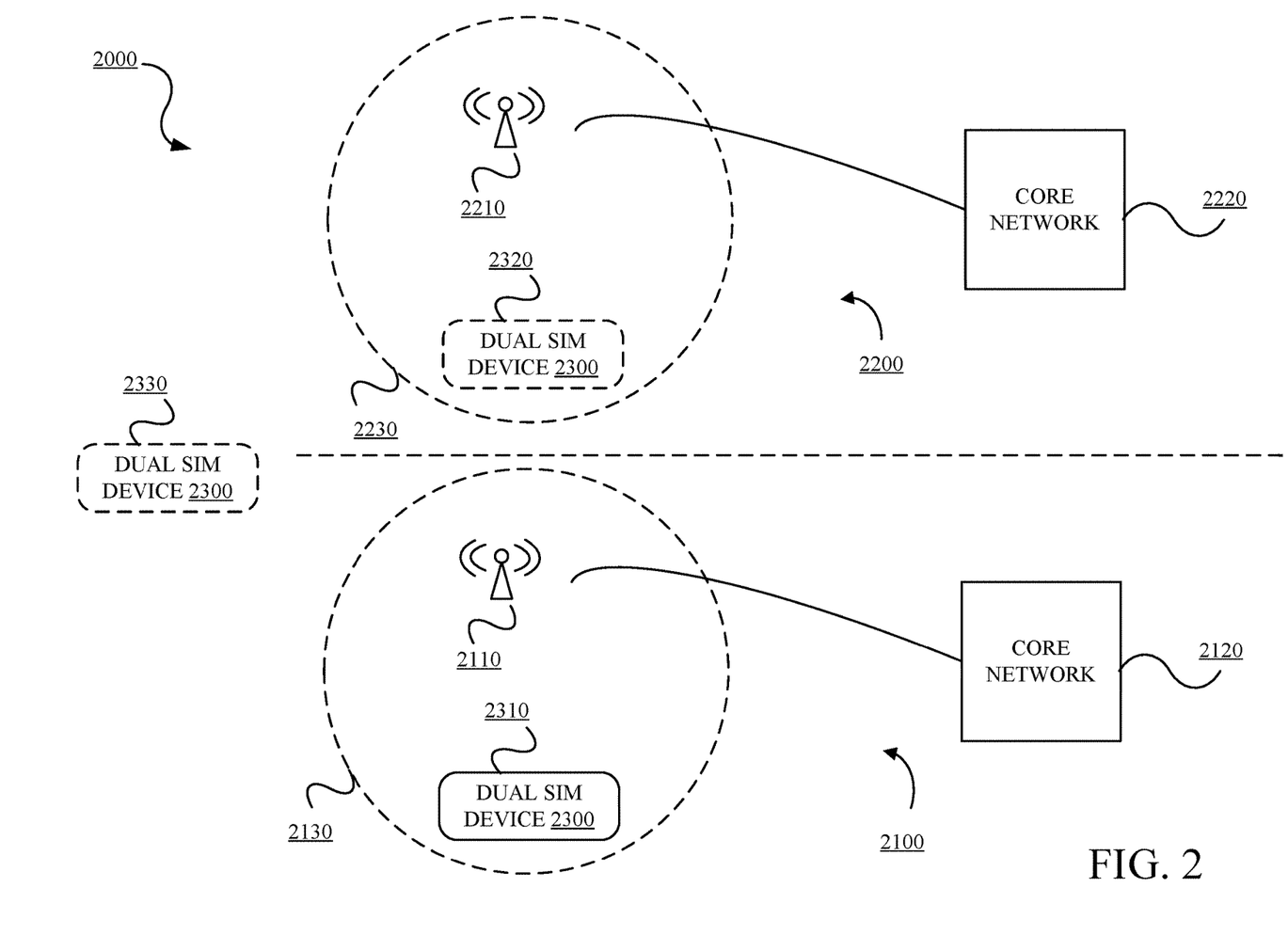
FIG. 2 is a diagram of an example architecture with a dual subscriber identification module (SIM) dual subscription (DSDS) device.

FIG. 2 is a diagram of an example architecture 2000 with a dual subscriber identification module (SIM) dual subscription (DSDS) device. The architecture 2000 includes a first network 2100 and a second network 2200. The first network 2100 one or more base stations 2110 connected to a core network 2120, which together provide a wireless coverage 2130. The second network 2200 one or more base stations 2210 connected to a core network 2220, which together provide a wireless coverage 2230. A DSDS device 2300 includes two SIMs, a first SIM for operation with or in the first network 2100 (shown as position 2310) and a second SIM for operation with or in the second network 2200 (shown as position 2320). The DSDS device 2300 can operate in either the first network 2100 or the second network 2200. For purposes of the ProSe function as described in FIG. 1, the DSDS device 2300 is not out of wireless coverage unless the DSDS device 2300 is in position 2330. That is, if the DSDS device 2300 is in either position 2310 or position 2320, the DSDS device 2300 is in wireless coverage with respect to the ProSe function. This means that if either the first network 2100 or the second network 2200 is a preferred network and there is a proximate DSDS device in the preferred network, the DSDS device 2300 that is not in the preferred network would be unable to establish a sidelink connection or interface (i.e., a PC5 link) with the proximate DSDS device to offload traffic data to the preferred network.

Described herein are methods, devices, and systems for providing an enhanced ProSe function to improve traffic usage on a preferred network. The described methods enable ProSe functionality as a mechanism for data offload to a preferred network by a DSDS device still in wireless coverage but not using the preferred network by providing an alternate data path to the preferred network by using another DSDS device that is in the preferred network as a relay hop. This is achieved by providing or provisioning a ProSe functionality in the preferred network which treats DSDS devices outside of the preferred network wireless coverage as an out of wireless coverage device (referred to herein as enhanced or improved ProSe function or functionality). In these instances, the preferred network is a service provider network associated with a service provider providing a subscriber or user the DSDS device or providing wireless access via the DSDS device. The other network is a network employed (but not owned or controlled) by the service provider for use by service provider provided DSDS devices.

In some implementations, the enhanced ProSe function can broadcast ProSe function availability or sidelink capability messages. For example, this can be a System Information Block (SIB) 18 message. Based on detection of the broadcast ProSe function availability messages, service provider provided DSDS devices can register with the enhanced ProSe function and configure connectivity to perform as a relay hop (device proximity permitting) for other service provider provided DSDS devices which may be out of wireless coverage with respect to the preferred network but are in wireless coverage with respect to the other network.

In some implementations, the enhanced ProSe function in conjunction with connection managers on the DSDS devices can enable discovery on a first DSDS device when the enhanced ProSe function detects a second DSDS device out of wireless coverage with respect to the preferred network. When the second DSDS device detects the first DSDS device, the first DSDS device and the second DSDS device can establish a sidelink connection to enable the second DSDS device to use the first DSDS device as a relay hop to use the preferred network for data transmission. By using the sidelink connection based relay-hop functionality, preferred network data usage can be maximized. This saves costs for the service provider.

In some implementation, a preferred network can be a hybrid mobile network operator (HMNO) network deployed by a service provider to offload data traffic from a non-preferred network such as a multiple virtual network operator (MVNO) network, which the service provider deploys via other wireless providers. The HMNO is owned or controlled by the service provider. By employing the enhanced ProSe function in the HMNO, the service provider can increase MVNO data offload opportunities to the HMNO, resulting in MVNO cost savings.

Figure 3:
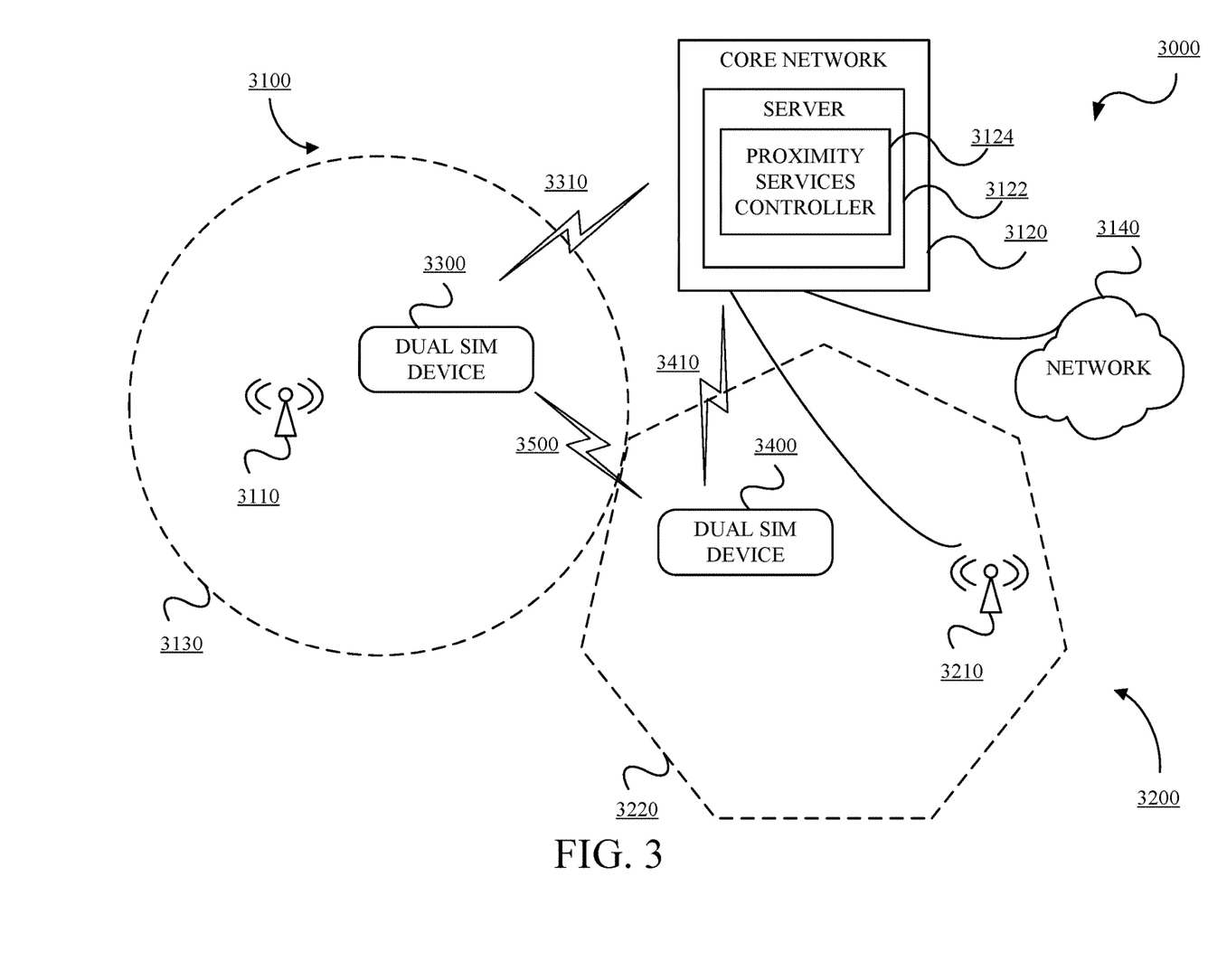
FIG. 3 is a diagram of an example architecture for enhanced proximity services functionality in accordance with embodiments of this disclosure.

FIG. 3 is a diagram of an example architecture 3000 for enhanced proximity services functionality in accordance with embodiments of this disclosure. In some implementations, the architecture 3000 can include a first network 3100 and a second network 3200. The first network 3100 includes one or more base stations 3110 connected to a core network 3120, which together provide a wireless coverage 3130. The core network 3120 may be in communication with a network 3140, which may include at least the Internet. For example, the first network 3100 can be a HMNO network, a small cell network, a hotspot, or like network owned or controlled by a service provider. The first network 3100 can be a preferred network. The second network 3200 can include one or more base stations 3210 connected to a core network (not shown), which together provide a wireless coverage 3220. For example, the second network 3200 can be a MVNO network employed, leased, or licensed by the service provider from another provider. The number of base stations is illustrative and the architecture 3000 may include more or less base stations. A DSDS device 3300 can be in communication with the one or more base stations 3110. A DSDS device 3400 can be in communication with the one or more base stations 3210. The communications between the one or more base stations 3110, the core network 3120, the network 3140, the one or more base stations 3210, the DSDS device 3300, and the DSDS device 3400, as appropriate and applicable, can include wired communications, wireless communications, or a combination thereof. In some implementations, the architecture 3000 may execute the techniques described in FIGS. 8-10. The architecture 3000 is illustrative and may include additional, fewer, or different devices, entities and the like which may be similarly or differently architected without departing from the scope of the specification and claims herein. Moreover, the illustrated devices may perform other functions without departing from the scope of the specification and claims herein.

The base stations 3110 and 3210 may be a node-B, an evolved node-B, an access point, an access node or like device which enables radio communications access between, for example, the DSDS device 3300 and other devices, or the DSDS device 3400 and other devices, respectively. Each base station base station 3110 and 3210 can have sectors which provide wireless communications coverage.

The DSDS device 3300 and the DSDS device 3400 can be, but is not limited to, end user devices, cellular telephones, Internet Protocol (IP) devices, mobile computers, laptops, handheld computers, personal media devices, smartphones, notebooks, notepads, and the like which may include two (2) SIMs and at least one radio. One SIM of each of the DSDS device 3300 and the DSDS device 3400 can be provisioned for operation with the first network 3100 and the other SIM can be provisioned for operation with the second network 3200. Each of the DSDS device 3300 and the DSDS device 3400 can include a connection manager to control and switch between SIMs and radio configurations to enable access and configure communication or data pathways with respect to the first network 3100 and the second network 3200 as described herein. The connection manager can be implemented as a combination of software and firmware on the DSDS device 3300 and the DSDS device 3400.

The core network 3120 can include, but is not limited to, components directed to connectivity, mobility management, authentication and authorization, subscriber data management, policy management, and like functionality. The core network 3120 can include, but is not limited to, a server 3122 which enables, provides, or provisions an enhanced ProSe function or application controller or manager 3124 for the first network 3100. The enhanced ProSe function controller 3124 can provide or enable data or traffic offloading to the first network 3100 from the second network 3200 if a DSDS device is in the second network 3200 and there is another DSDS device in the first network 3100 which is proximate to the DSDS device in the second network 3200 as described herein. The enhanced ProSe function controller 3124 processing can result in a sidelink path established between the two DSDS devices (via D2D communications) to offload or direct traffic or data over the first network 3100.

Figure 4:
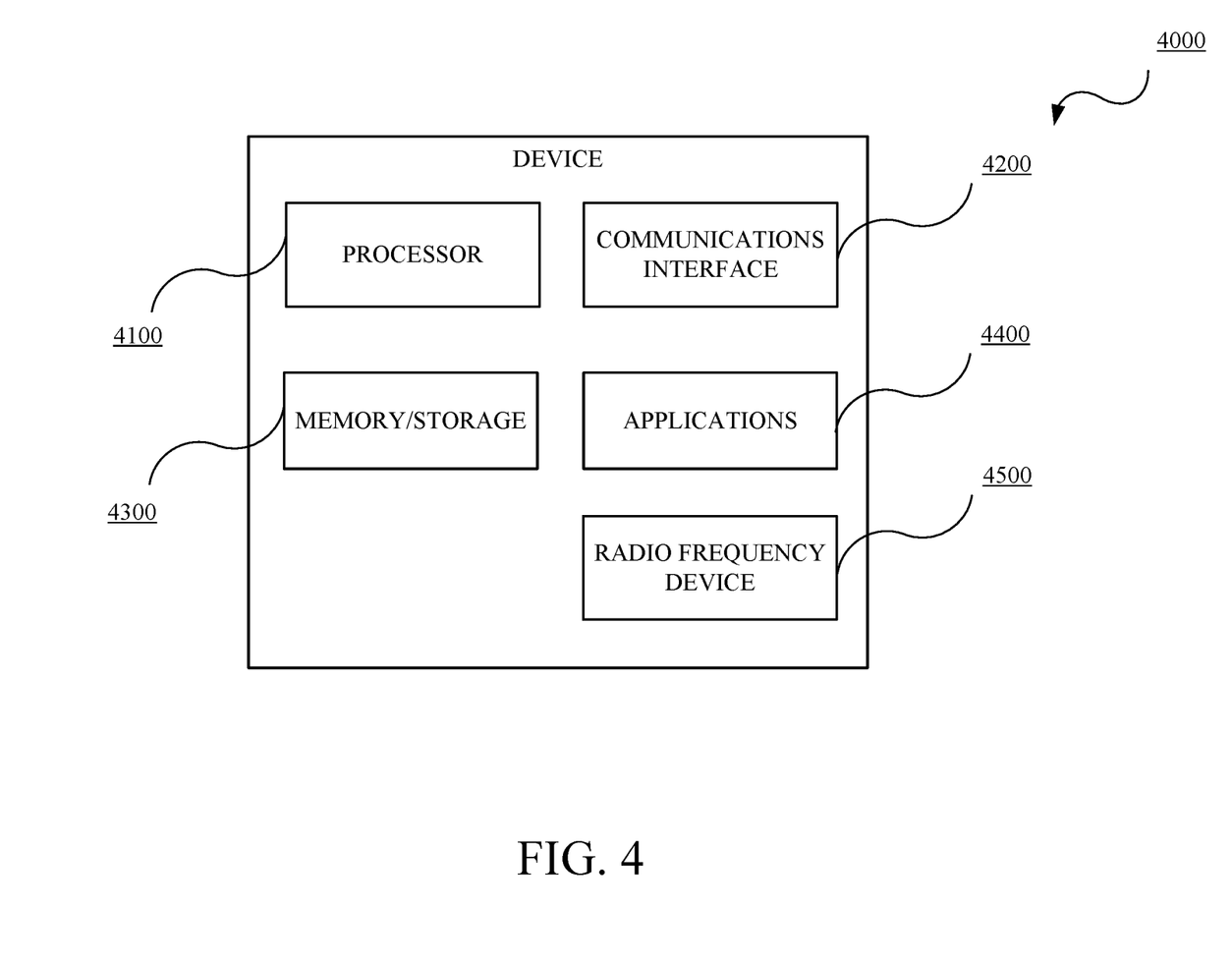
FIG. 4 is a block diagram of an example of a device in accordance with embodiments of this disclosure.

FIG. 4 is a block diagram of an example of a device 4000 in accordance with embodiments of this disclosure. The device 4000 can include, but is not limited to, a processor 4100, a memory/storage 4200, a communication interface 4300, applications 4400, and a radio frequency device 4500. The device 4000 may include or implement, for example, any of the base stations 3110 and 3210. The applicable or appropriate techniques or methods described herein may be stored in the memory/storage 4200 and executed by the processor 4100 in cooperation with the memory/storage 4200, the communications interface 4300, the applications 4400, and the radio frequency device 4500 as appropriate. The device 4000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Figure 5:
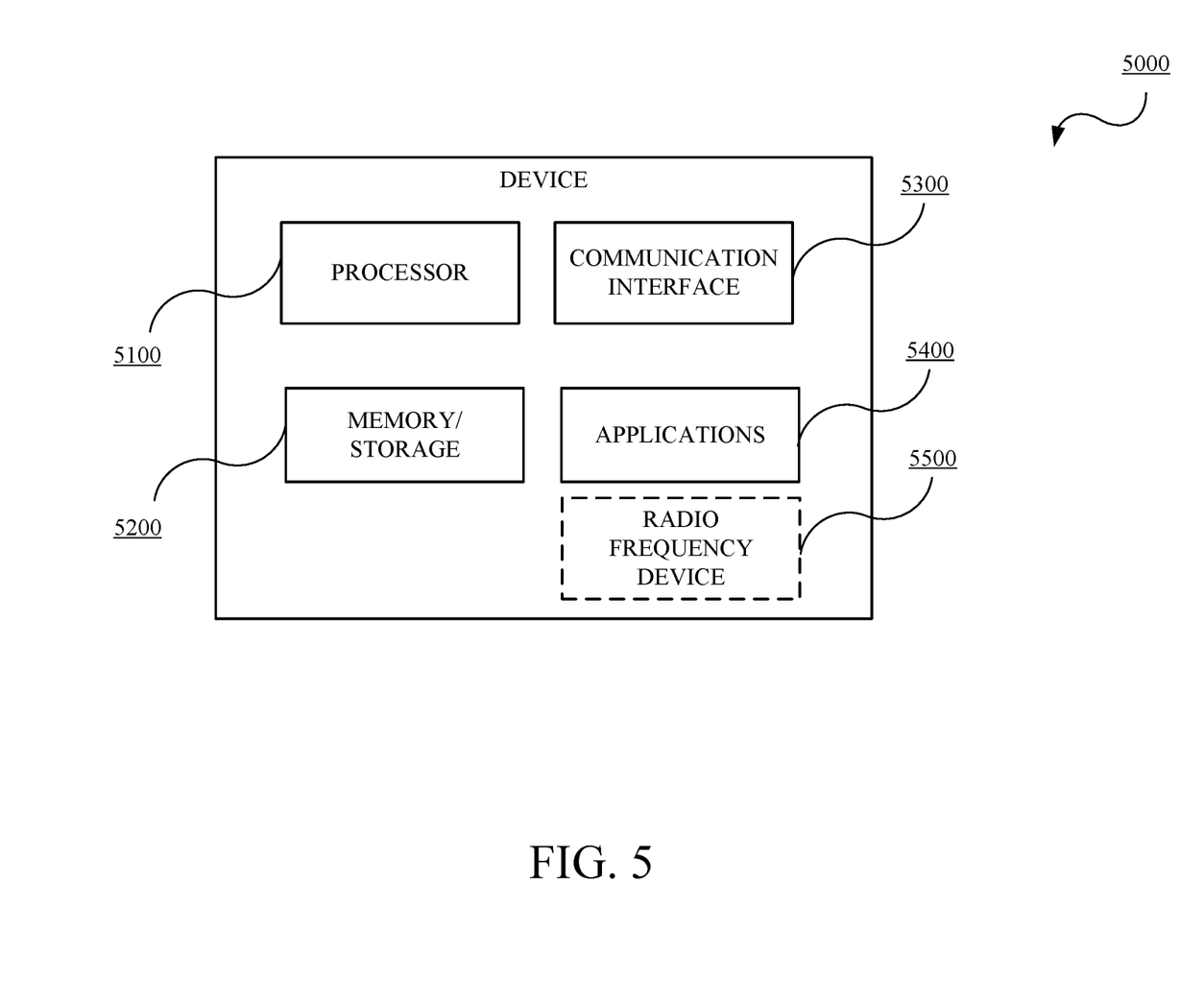
FIG. 5 is a block diagram of an example of a device in accordance with embodiments of this disclosure.

FIG. 5 is a block diagram of an example of a device 5000 in accordance with embodiments of this disclosure. The device 5000 can include, but is not limited to, a processor 5100, a memory/storage 5200, a communication interface 5300, and applications 5400. In some implementations, the device 5000 may include a radio frequency device 5500. The device 5000 may include or implement, for example, components of the core network 3120 and the server 3122. In some implementations, the memory/storage 5200 may store code and instructions for the enhanced ProSe function controller 3124. In some implementations, the applications 5400 can be the enhanced ProSe function controller 3124. The applicable or appropriate techniques or methods described herein may be stored in the memory/storage 5200 and executed by the processor 5100 in cooperation with the memory/storage 5200, the communications interface 5300, the applications 5400, and the radio frequency device 5500 (when applicable) as appropriate. The device 5000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 6:
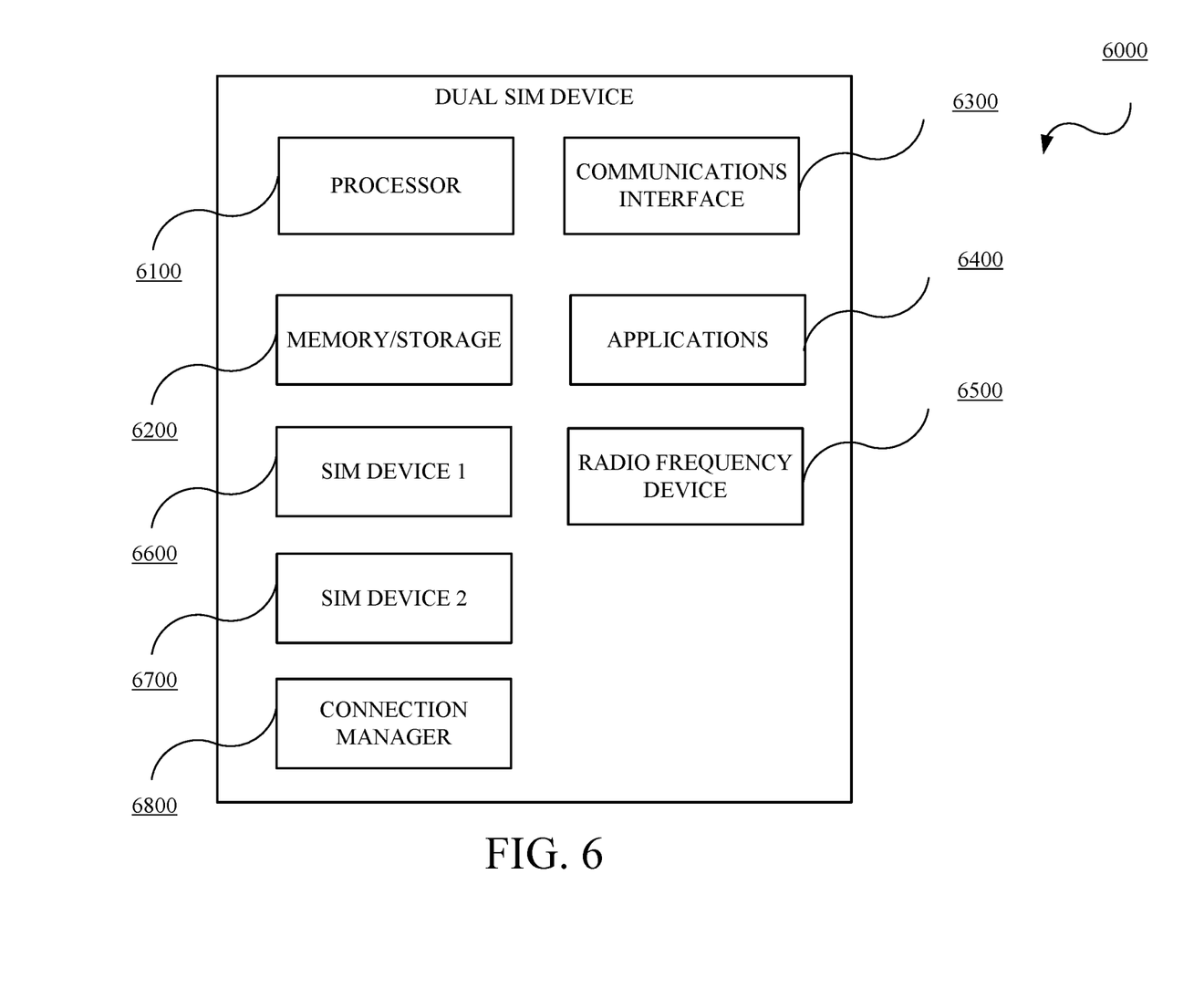
FIG. 6 is a block diagram of an example of a DSDS device in accordance with embodiments of this disclosure.

FIG. 6 is a block diagram of an example of a device 6000 in accordance with embodiments of this disclosure. The device 6000 may include, but is not limited to, a processor 6100, a memory/storage 6200, a communication interface 6300, applications 6400, a radio frequency device 6500, a first SIM 6600, a second SIM 6700, and a connection manager 6800. The device 6000 may include or implement, for example, the DSDS devices 3300 and 3400. The applicable or appropriate techniques or methods described herein may be stored in the memory/storage 6200 and executed by the processor 6100 in cooperation with the memory/storage 6200, the communications interface 6300, the applications 6400, the radio frequency device 6500, the first SIM 6600, the second SIM 6700, and the connection manager 6800, as appropriate. In an implementation, the first SIM 6600 may be provisioned with or for a HMNO network and the second SIM 6700 may be provisioned with or for a MVNO network. In some implementations, the first SIM 6600 and the second SIM 6700 may operate on a time-slotted basis with the radio frequency device 6500. The device 6000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Figure 7:
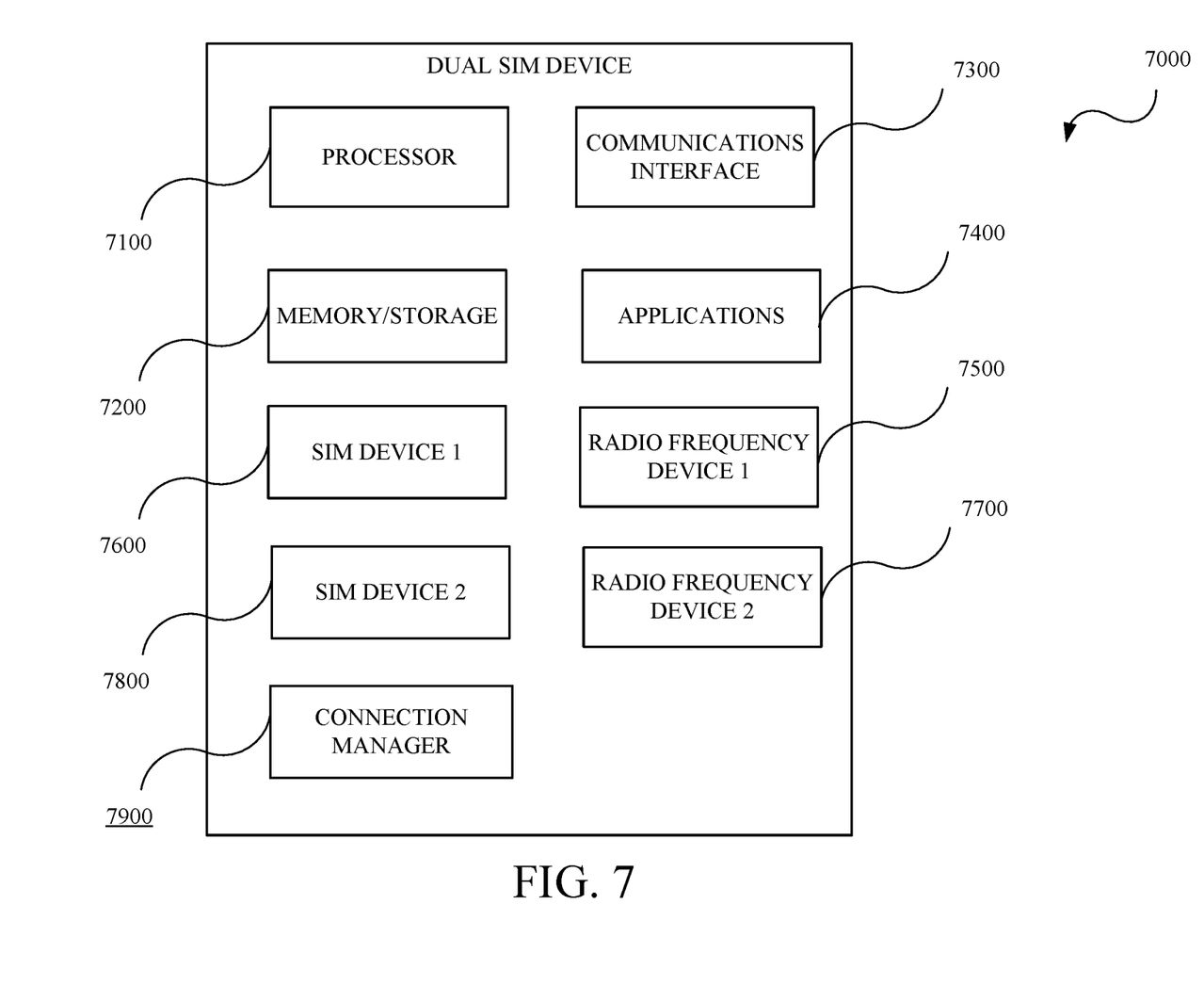
FIG. 7 is a block diagram of an example of another DSDS in accordance with embodiments of this disclosure.

FIG. 7 is a block diagram of an example of a device 7000 in accordance with embodiments of this disclosure. The device 7000 may include, but is not limited to, a processor 7100, a memory/storage 7200, a communication interface 7300, applications 7400, a radio frequency device 1 7500, a first SIM 7600, a radio frequency device 2 7700, a second SIM 7800, and a connection manager 7900. The device 7000 may include or implement, for example, the DSDS devices 3300 and 3400. The applicable or appropriate techniques or methods described herein may be stored in the memory/storage 7200 and executed by the processor 7100 in cooperation with the memory/storage 7200, the communications interface 7300, the applications 7400, the radio frequency device 1 7500, the first SIM 7600, the radio frequency device 2 7700, the second SIM 7800, and the connection manager 7900, as appropriate. In some implementations, the first SIM may be provisioned with or for a HMNO network and the second SIM 7700 may be provisioned with or for a MVNO network. In some implementations, the first SIM 7600 may operate with the radio frequency device 1 7500 and the second SIM 7800 may operate with the radio frequency device 2 7700. The device 7000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Figure 8:
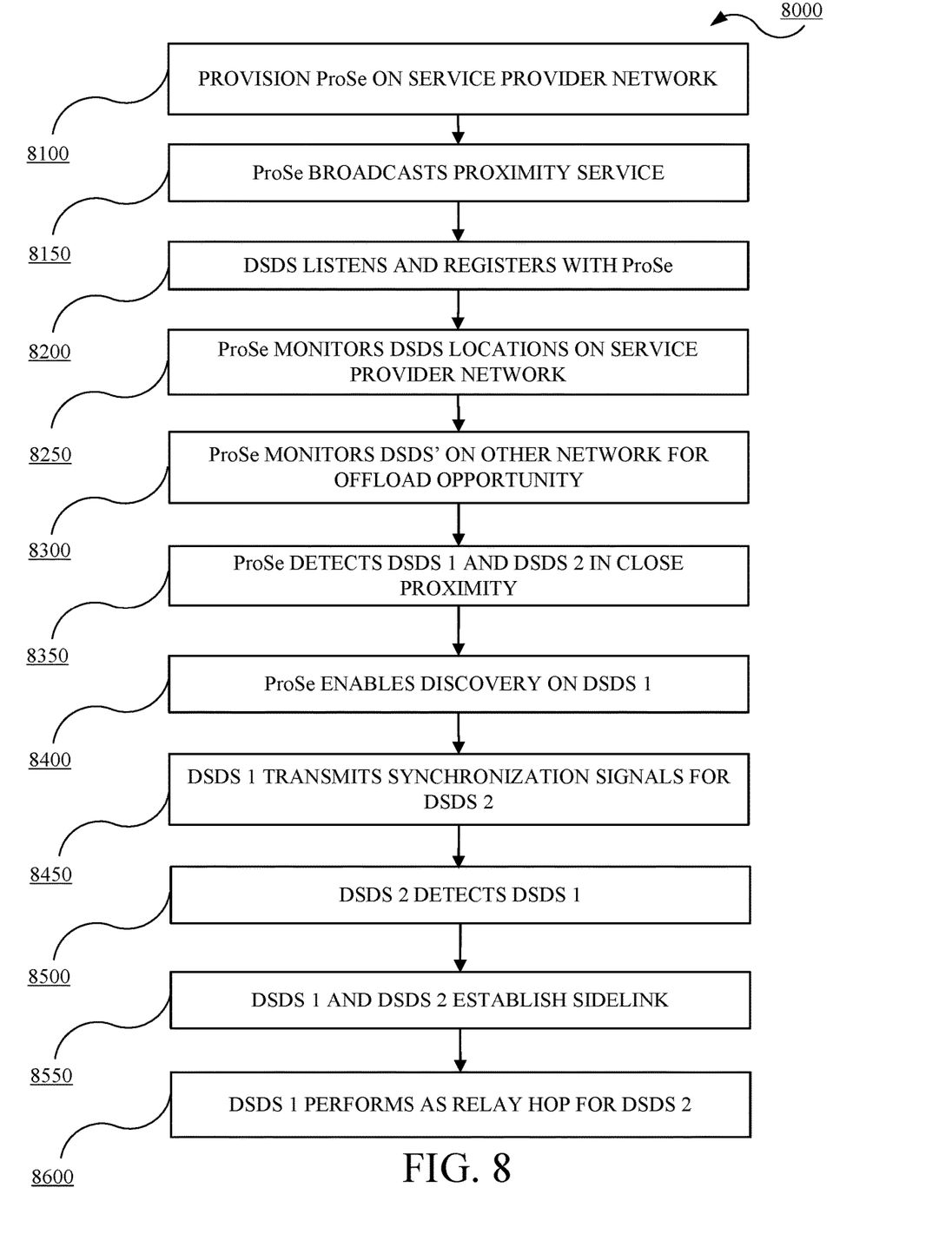
FIG. 8 is a flowchart of an example method for providing enhanced proximity services functionality in accordance with embodiments of this disclosure.

FIG. 8 is a flowchart of an example method 8000 for providing enhanced proximity services functionality in accordance with embodiments of this disclosure. Referring now also to FIGS. 3-7, as appropriate and applicable, a service provider can provision the first network 3100 with the enhanced ProSe function controller 3124 (8100). The enhanced ProSe function controller 3124, via the core network 3120, can transmit control signals indicative of proximity service availability (8150). The service provider provided DSDS devices such as the DSDS device 3300 and the DSDS device 3400 can listen for the control signals and register with the enhanced ProSe function controller 3124 (8200). The enhanced ProSe function controller 3124 can monitor the position of DSDS devices operating on the first network 3100 (8250). The enhanced ProSe function controller 3124 can monitor DSDS devices on the second network 3200 for offload opportunities (8300). For example, the enhanced ProSe function controller 3124 can detect that the DSDS device 3400 is operating on the second network 3200. The enhanced ProSe function controller 3124 can detect that the DSDS device 3300, which is operating in the first network, is proximate to the DSDS device 3400 (8350). The enhanced ProSe function controller 3124 can enable discovery on the DSDS device 3300 via a communication channel 3310 and can enable discovery on the DSDS device 3400 via a communication channel 3410 (8400). The DSDS device 3300 can transmit control signals, such as synchronization signals, to enable discovery by the DSDS device 3400 (8450). For example, D2D signaling or communications can be used. The DSDS device 3400 can detect the DSDS device 3300 (8500) and can establish a sidelink connection 3500 (8550). The DSDS device 3300 can act as a relay hop and forward or offload traffic from the DSDS device 3400 using the sidelink channel 3500 for transmission over the first network 3100 (8600). The offloading can be implemented by the connection managers in the DSDS device 3300 and the DSDS device 3400 using the two SIM devices and radio configurations in each of the DSDS device 3300 and the DSDS device 3400.

Figure 9:
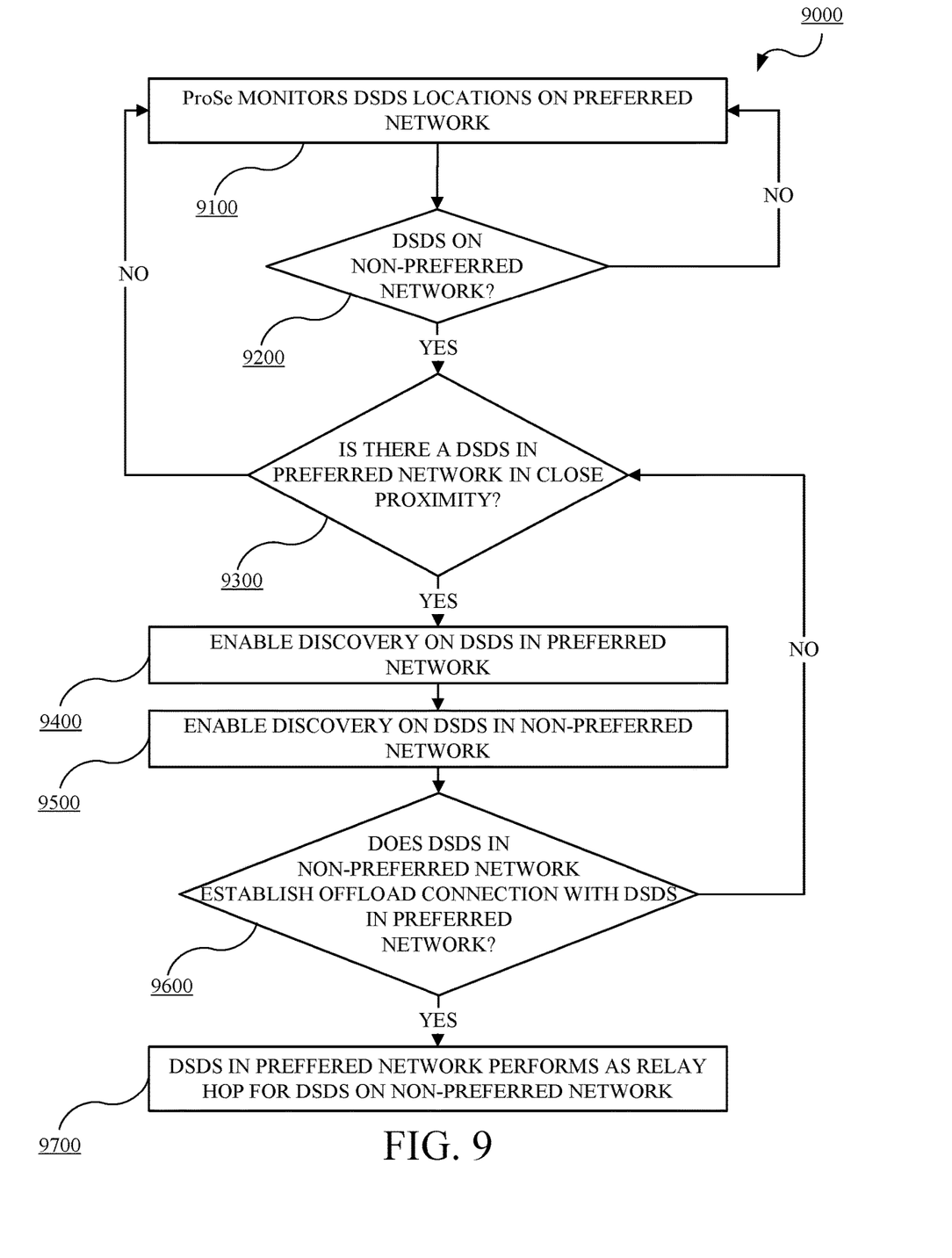
FIG. 9 is a flowchart of an example method for providing enhanced proximity services functionality in accordance with embodiments of this disclosure.

FIG. 9 is a flowchart of an example method 9000 for providing enhanced proximity services functionality in accordance with embodiments of this disclosure. The method 9000 includes: monitoring 9100 DSDS devices on a preferred network; determining 9200 whether DSDS devices are on a non-preferred network; determining 9300 whether a DSDS device on the preferred network is proximate to the detected DSDS device on the non-preferred network; enabling 9400 discovery on the proximate DSDS device on the preferred network; enabling 9500 discovery on the detected DSDS device on the non-preferred network; determining 9600 whether offload connection is successful; and offloading 9700 data communications for the detected DSDS device on the non-preferred network to the preferred network via the proximate DSDS device on the preferred network. For example, the method 9000 can be implemented, as applicable and appropriate, by or in the first network 3100, the second network 3200, the one or more base stations 3110, the core network 3120, the one or more base stations 3210, the DSDS device 3300, the DSDS device 3400, the server 3122, the enhanced ProSe function controller 3124, the device 4000, the device 5000, the device 6000, and the device 7000, as appropriate and applicable.

The method 9000 includes monitoring 9100 DSDS devices on a preferred network. A service provider provides DSDS devices which can operate on two networks, a preferred network and a non-preferred network. For example, the preferred network can be a network owned or controlled by the service provider. For example, the non-preferred network is infrastructure of another provider, which the service provider is paying to use. The service provider provisions an enhanced ProSe function onto the preferred network to enable offloading traffic as described herein. The enhanced ProSe function signals availability of the proximity services or offloading capability to DSDS devices provided by the service provider. DSDS devices detecting the enhanced ProSe function signals can register with the enhanced ProSe function to perform or act as a relay hop when appropriate. The enhanced ProSe function can monitor the location of DSDS devices operating on the preferred network. In some implementations, the locations can be stored and updated on a defined basis.

The method 9000 includes determining 9200 whether DSDS devices are on a non-preferred network. The enhanced ProSe function can detect for the presence of DSDS devices operating on the non-preferred network.

The method 9000 includes determining 9300 whether a DSDS device on the preferred network is proximate to the detected DSDS device on the non-preferred network. Upon detection of a DSDS device operating on the non-preferred network, the enhanced ProSe function can determine if there is a DSDS device operating on the preferred network that is proximate to the location of the DSDS device operating on the non-preferred network. The enhanced ProSe function can continue to look for such a DSDS device until successfully detected or offload opportunity is no longer available.

The method 9000 includes enabling 9400 discovery on the proximate DSDS device on the preferred network. The enhanced ProSe function can enable discovery on the DSDS device on the preferred network upon successful detection of the DSDS device on the preferred network that is proximate to the DSDS device operating on the non-preferred network.

The method 9000 includes enabling 9500 discovery on the detected DSDS device on the non-preferred network. The enhanced ProSe function can enable discovery on the DSDS device on the non-preferred network upon successful detection of a DSDS device on the preferred network that is proximate to the DSDS device operating on the non-preferred network.

The method 9000 includes determining 9600 whether offload connection is successful. The DSDS device on the preferred network can transmit control signals, synchronization signals, or D2D communication signals to the DSDS device operating on the non-preferred network. Upon detection by the DSDS device operating on the non-preferred network, the DSDS device operating on the non-preferred network and the DSDS device on the preferred network can establish a sidelink communication channel. If sidelink communication channel cannot be successfully established, the enhanced ProSe function can determine if there is another proximate DSDS device on the preferred network.

The method 9000 includes offloading 9700 data communications for the detected DSDS device on the non-preferred network to the preferred network via the proximate DSDS device on the preferred network. Upon successful establishment of the sidelink communication channel, the proximate DSDS device on the preferred network can receive traffic from the DSDS device on the non-preferred network over the sidelink communication channel and act as a relay hop to offload or transmit the traffic over the preferred network.

Figure 10:
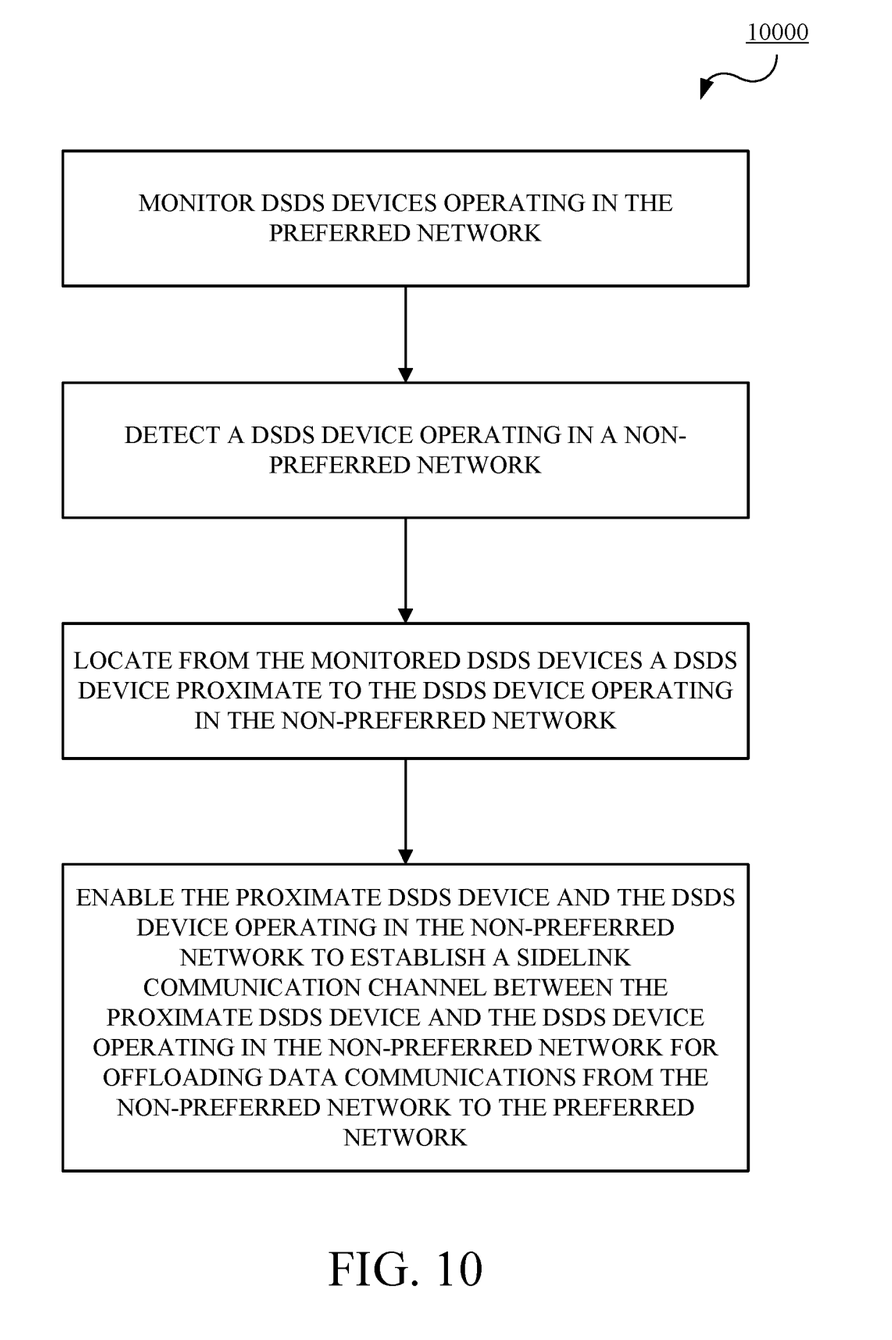
FIG. 10 is a flowchart of an example method for providing enhanced proximity services functionality in accordance with embodiments of this disclosure.

FIG. 10 is a flowchart of an example method 10000 for providing enhanced proximity services functionality in accordance with embodiments of this disclosure. The method 10000 includes monitoring 10100 DSDS devices operating in the preferred network; detecting 10200 a DSDS device operating in a non-preferred network; locating 10300 from the monitored DSDS devices a DSDS device proximate to the DSDS device operating in the non-preferred network; and enabling 10400 the proximate DSDS device and the DSDS device operating in the non-preferred network to establish a sidelink communication channel between the proximate DSDS device and the DSDS device operating in the non-preferred network for offloading data communications from the non-preferred network to the preferred network. For example, the method 10000 can be implemented, as applicable and appropriate, by or in the first network 3100, the second network 3200, the one or more base stations 3110, the core network 3120, the one or more base stations 3210, the DSDS device 3300, the DSDS device 3400, the server 3122, the enhanced ProSe function controller 3124, the device 4000, the device 5000, the device 6000, and the device 7000, as appropriate and applicable.

The method 10000 includes monitoring 10100 DSDS devices operating in the preferred network. A proximity services controller provisioned in a preferred network monitors DSDS devices operating in the preferred network. The DSDS devices provided by a service provider. The DSDS devices are configured to operate in the preferred network or in a non-preferred network depending on coverage availability.

The method 10000 includes detecting 10200 a DSDS device operating in a non-preferred network. The proximity services controller can detect DSDS device(s) operating in the non-preferred network. These detected DSDS devices present offload opportunities.

The method 10000 includes locating 10300 from the monitored DSDS devices a DSDS device proximate to the DSDS device operating in the non-preferred network. The proximity services controller determines whether a DSDS device operating in the preferred network is proximate to the DSDS device operating in the non-preferred network.

The method 10000 includes enabling 10400 the proximate DSDS device and the DSDS device operating in the non-preferred network to establish a sidelink communication channel between the proximate DSDS device and the DSDS device operating in the non-preferred network for offloading data communications from the non-preferred network to the preferred network. The proximity services controller enables discovery in the proximate DSDS device and the DSDS device operating in the non-preferred network. The proximate DSDS device can transmit synchronization signals for detection by the DSDS device operating in the non-preferred network. Upon successful detection, the DSDS device operating in the non-preferred network and the proximate DSDS device establish the sidelink channel.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for traffic offloading, the method comprising:
    monitoring, by a proximity services controller provisioned in a preferred network, dual subscriber identification module (SIM) dual subscriber (DSDS) devices operating in the preferred network;
    detecting, by the proximity services controller, a DSDS device operating in a non-preferred network, wherein the DSDS devices and the DSDS device operating in the non-preferred network are configured to switchably operate in one of the preferred network or the non-preferred network based on coverage;
    locating, by the proximity services controller, from the monitored DSDS devices a DSDS device proximate to the DSDS device operating in the non-preferred network; and
    enabling, by the proximity services controller, the proximate DSDS device and the DSDS device operating in the non-preferred network to establish a sidelink communication channel between the proximate DSDS device and the DSDS device operating in the non-preferred network for offloading data communications from the non-preferred network to the preferred network.

2. The method of claim 1, the method further comprising:
    enabling, by the proximity services controller, discovery on the proximate DSDS device.

3. The method of claim 1, the method further comprising:
    enabling, by the proximity services controller, discovery on the DSDS device operating in the non-preferred network.

4. The method of claim 1, the method further comprising:
    enabling, by the proximity services controller, the proximate DSDS device to send control signals for detection by the DSDS device operating in the non-preferred network.

5. The method of claim 4, wherein the control signals are synchronization signals.

6. The method of claim 1, the method further comprising:
    transmitting, by the proximity services controller, proximity service availability signals to service provider provided DSDS devices.

7. The method of claim 6, the method further comprising:
    registering, by the proximity services controller, the service provider provided DSDS devices requesting registration as relay hop devices.

8. The method of claim 7, wherein the registered service provider provided DSDS devices include the proximate DSDS device and the monitored DSDS devices.

9. A service provider network, comprising:
    a first network configured to provide wireless coverage to service provider provided dual subscriber identification module (SIM) dual subscriber (DSDS) devices, the first network owned or controlled by the service provider;
    a second network configured to provide wireless coverage to the service provider provided DSDS devices, the second network licensed by the service provider, wherein the service provider provided DSDS devices are configured to operate in one of the first network or the second network based on coverage availability; and
    a proximity service controller located in a core network of the first network and configured to operate with the first network, the proximity service controller configured to:
        detect whether a service provider provided DSDS device from the service provider provided DSDS devices is operating in the second network;
        determine whether there is a service provider provided DSDS device from the service provider provided DSDS devices operating in the first network proximate to the service provider provided DSDS device operating in the second network; and
        permit the service provider provided DSDS device operating in the first network to act as a relay hop for the service provider provided DSDS device operating in the second network to offload traffic to the first network from the second network.

10. The service provider network of claim 9, the proximity service controller configured to:
    initiate discovery on the proximate service provider provided DSDS device operating in the first network.

11. The service provider network of claim 9, the proximity service controller configured to:
    initiate discovery on the detected service provider provided DSDS device operating in the second network.

12. The service provider network of claim 9, the proximity service controller configured to:
    permit the proximate service provider provided DSDS device operating in the first network to send device-to-device control signals for detection by the detected service provider provided DSDS device operating in the second network.

13. The service provider network of claim 12, wherein the device-to-device control signals are synchronization signals.

14. The service provider network of claim 9, the proximity service controller configured to:
    broadcast proximity service availability signals to service provider provided DSDS devices.

15. The service provider network of claim 9, the proximity service controller configured to:
    register the service provider provided DSDS devices requesting registration as relay hop devices.

16. The service provider network of claim 9, the proximity service controller configured to:
    monitor the service provider provided DSDS devices operating in the first network.

17. A method for offloading data communications, the method comprising:
    detecting, by a proximity manager, whether a service provider provided dual subscriber identification module (SIM) dual subscriber (DSDS) device is operating in a service provider paying-for-use network;
    determining, by a proximity manager, whether there is a different service provider provided DSDS operating in a service provider owned network proximate to the service provider provided DSDS device operating in the service provider paying-for-use network; and
    permitting, by a proximity manager, the different service provider provided DSDS device operating in the service provider owned network to act as a relay hop for the service provider provided DSDS device operating in the service provider paying-for-use network to offload data communications to the service provider owned network from the service provider paying-for-use network.

18. The method of claim 17, the method further comprising:
    enabling, by the proximity manager, discovery on the proximate different service provider DSDS device operating in the service provider owned network; and
    enabling, by the proximity manager, discovery on the service provider provided DSDS operating in the service provider paying-for-use network.

19. The method of claim 17, the method further comprising:
- enabling, by the proximity manager, the proximate different service provider DSDS device operating in the service provider owned network to send synchronization signals for detection by the DSDS device operating in the service provider paying-for-use network.

20. The method of claim 17, the method further comprising:
- transmitting, by the proximity manager, proximity service availability signals to service provider provided DSDS devices; and
- registering, by the proximity manager, the service provider provided DSDS devices requesting registration as relay hop devices.

* * * * *